US012746741B2

(12) United States Patent
Fischer et al.

(10) Patent No.: US 12,746,741 B2
(45) Date of Patent: Sep. 29, 2026

(54) GLASS PANE OF A VEHICLE GLAZING HAVING A PRINT

(71) Applicant: Webasto SE, Stockdorf (DE)

(72) Inventors: Henner Fischer, Stockdorf (DE); Alois Müller, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 121 days.

(21) Appl. No.: 18/684,026

(22) PCT Filed: Aug. 11, 2022

(86) PCT No.: PCT/EP2022/072562
§ 371 (c)(1),
(2) Date: Feb. 15, 2024

(87) PCT Pub. No.: WO2023/020933
PCT Pub. Date: Feb. 23, 2023

(65) Prior Publication Data
US 2024/0416626 A1 Dec. 19, 2024

(30) Foreign Application Priority Data
Aug. 16, 2021 (DE) ..................... 10 2021 121 195.6

(51) Int. Cl.
*B32B 17/10* (2006.01)
*B32B 1/00* (2024.01)
(Continued)

(52) U.S. Cl.
CPC ............ *B32B 17/1044* (2013.01); *B32B 1/00* (2013.01); *B32B 17/10036* (2013.01);
(Continued)

(58) Field of Classification Search
CPC . B32B 17/1044; B32B 1/00; B32B 17/10036; B32B 17/10807; B41M 5/0011;
(Continued)

(56) References Cited

U.S. PATENT DOCUMENTS

2011/0267833 A1 11/2011 Verrat-Debailleul
2015/0103123 A1 4/2015 Chen
(Continued)

FOREIGN PATENT DOCUMENTS

CN 104553422 A 4/2015
DE 102011016392 A1 10/2012
(Continued)

OTHER PUBLICATIONS

ISR issued for corresponding PCT/EP2022/072562 Application; mailed Nov. 14, 2022; In German and English (13 pages).
(Continued)

*Primary Examiner* — Tahseen Khan
(74) *Attorney, Agent, or Firm* — Fitch, Even, Tabin & Flannery, LLP

(57) ABSTRACT

A glass pane of a vehicle glazing, wherein the glass pane has a print containing scattering particles that scatter light, and wherein light coupled in at the side of the glass pane is coupled out via the print by means of the scattering particles. According to the invention, the glass pane has a curvature or a critical curvature which excludes reversible deformation of the glass pane into a planar configuration, and wherein the print formed with a printing ink in a digital printing process is situated over part of the surface, or the entire surface, of the outer curvature or the inner curvature of the glass pane.

16 Claims, 2 Drawing Sheets

Figure 1:
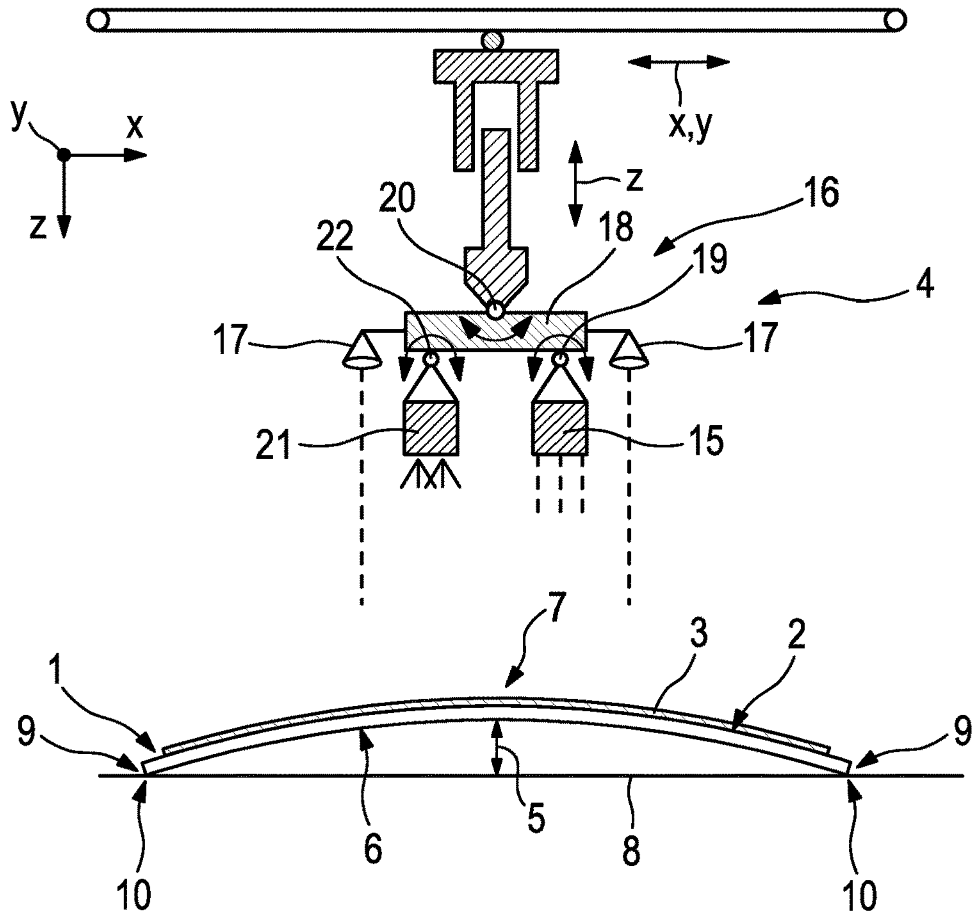

(51) Int. Cl.

| | |
|---|---|
| ***B41M 5/00*** | (2006.01) |
| ***B41M 7/00*** | (2006.01) |
| ***C03C 17/00*** | (2006.01) |
| ***C03C 23/00*** | (2006.01) |

(52) U.S. Cl.

CPC ..... *B32B 17/10807* (2013.01); *B41M 5/0011* (2013.01); *B41M 5/007* (2013.01); *B41M 5/0088* (2013.01); *B41M 7/0009* (2013.01); *B41M 7/0081* (2013.01); *C03C 17/007* (2013.01); *C03C 23/0025* (2013.01); *C03C 23/006* (2013.01); *C03C 23/0075* (2013.01); *B32B 2605/00* (2013.01); *C03C 2217/48* (2013.01); *C03C 2218/119* (2013.01); *C03C 2218/31* (2013.01)

(58) Field of Classification Search

CPC .. B41M 5/007; B41M 5/0088; B41M 7/0009; B41M 7/0081; C03C 17/007; C03C 23/0025; C03C 23/006; C03C 23/0075

USPC .......................................................... 428/174

See application file for complete search history.

(56) References Cited

U.S. PATENT DOCUMENTS

| | | | | |
|---|---|---|---|---|
| 2015/0210040 | A1 | 7/2015 | Böhm | |
| 2015/0298601 | A1* | 10/2015 | Bott | B32B 17/10541 362/520 |
| 2018/0111412 | A1 | 4/2018 | O'Ryan | |
| 2019/0381786 | A1 | 12/2019 | Watanabe | |
| 2020/0215834 | A1 | 7/2020 | Bauer | |
| 2021/0116630 | A1 | 4/2021 | Wang | |

FOREIGN PATENT DOCUMENTS

| | | | | |
|---|---|---|---|---|
| DE | 102012109900 | A1 | 4/2014 | |
| DE | 102014100838 | A1 | 7/2015 | |
| DE | 102017114280 | A1 | 12/2018 | |
| DE | 102019112889 | A1 | 11/2020 | |
| EP | 0993957 | A2 | 4/2000 | |
| EP | 3312147 | A1 | 4/2018 | |
| JP | 2017501044 | A | 1/2017 | |
| JP | 2019214024 | A | 12/2019 | |
| JP | 202027738 | A | 2/2020 | |
| WO | WO-2014167291 | A1 * | 10/2014 | G02B 6/0043 |
| WO | WO-2018215308 | A1 * | 11/2018 | C03C 8/16 |

OTHER PUBLICATIONS

Office Action issued for corresponding German Application No. 10 2021 121 195.6; dated Mar. 21, 2022; In German with English Machine Translation (14 pages).

Office Action issued in corresponding Japanese Application No. JP 2024508684; mailed Oct. 27, 2025; In Japanese with English machine translation (12 pages).

Office Action issued in parallel Chinese Application No. 202280056231.7; date mailed: Jun. 17, 2026; in Chinese with English machine translation (20 pages) Some references cited in office action were cited by Applicant in previous IDS.

Tian Jianwei et al., Comprehensive Digital Printing, p. 6, Intellectual Property Publishing House, Beijing, Nov. 2020; in Chinese with English machine translation (6 pages).

* cited by examiner

GLASS PANE OF A VEHICLE GLAZING HAVING A PRINT

CROSS-REFERENCE TO RELATED APPLICATIONS

This application is a U.S. national phase application filed under 35 U.S.C. § 371 of International Application No. PCT/EP2022/072562, filed on Aug. 11, 2022, published under WO 2023/020933A1 on Feb. 23, 2023, designating the United States, which claims priority from German Patent Application Number 10 2021 121 195.6, filed on Aug. 16, 2021, which are hereby incorporated herein by reference in their entirety.

FIELD

The invention relates to a glass pane of a vehicle glazing, where the glass pane has a print containing light-scattering particles, and where light coupled laterally into the glass pane is outcoupled via the print by means of the scattering particles. The invention further relates to a method of producing a glass pane of a vehicle glazing and having a print containing light-scattering particles, where light coupled laterally into the glass pane is outcoupled via the print by means of the scattering particles.

BACKGROUND

It is known that a coating can be applied by screenprinting to glass panes from which, for example, glass sunroof covers are produced and which have slight curvature. The glass panes here are firstly elastically deformed into a planar shape by means of an apparatus, such that they can be coated or printed by screenprinting, which can be applied only to essentially planar planes. However, such an elastic deformation of a glass pane, because of the material properties of glass, is possible only in the case of slightly curved glass panes. Relatively highly curved glass panes or regions of glass panes cannot be deformed to a planar shape for printing because of these material properties and expected breakage of the glass.

DE 10 2012 109 900 A1 discloses vehicle glazing with a light-guiding layer in the form of a glass pane. Light coupled laterally into the glass pane is emitted into the interior of the vehicle via outcoupling means such as light-scattering particles.

SUMMARY

It is an object of the invention to provide a glass pane as specified at the outset, which is improved with regard to the print to be applied, and to improve a method as specified at the outset for production of such a glass pane.

The object is achieved in accordance with the invention in the case of the glass pane mentioned at the outset in that the glass pane has a curvature or critical curvature that rules out reversible deformation of the glass pane to a planar configuration and in that the print formed by a printing ink in a digital printing method is disposed over part of the area or the whole of the area on the outer curvature or the inner curvature of the glass pane.

The object is also achieved by a method having the features of claim 9.

Advantageous configurations of the invention are specified in the dependent claims.

Accordingly, the glass pane of the invention receives the print formed by a printing ink in its curved and especially in its critically curved shape, in which it has a critical degree of curvature. The print here is disposed over part of the area or the whole of the area on the outer curvature or the inner curvature of the glass pane in a digital printing method. A digital printing method can be used to print slightly curved glass panes, and also more highly curved glass panes or curved regions of such glass panes. The glass pane may be curved only about one axis or else about several axes such as the x axis and the y axis in accordance with a vehicle coordinate system.

There is no need for temporary deformation of the glass pane into a shape in which at least one region to be printed is planar and hence would be suitable for screenprinting. The glass pane may be merely slightly curved in the region to be printed, which may cover the whole glass area of the glass pane or one or more subregions, or else have a critical degree of curvature or critical curvature. A critical curvature is a curvature that rules out reversible deformation of the glass pane to a planar configuration.

The term "printing ink" shall refer to print media such as printing inks, printing colors or else printing varnishes. In addition, it is also possible to use functional printing inks as described hereinafter for the method of the invention.

The glass pane is, for example, a quartz glass, a toughened float glass or a tempered safety glass or a heat-strengthened glass or else, in particular, a low-iron glass. The glass pane may also have been produced from a plastic, for example polycarbonate. The printed glass pane may be used for production of a composite glass pane.

The vehicle glazing is, for example, a glass sunroof cover, a front windshield or rear window, a display of a motor vehicle, a vehicle light or another interior or exterior component, and may also be used in displays, fittings and/or lights.

In an alternative embodiment, the print has been printed onto a foil mounted on the curved glass pane. In this embodiment, the foil may be in a planar or else curved arrangement for the printing. After the printing, the print-bearing foil is applied to and especially laminated onto the curved glass pane. In a composite glass pane, the foil is appropriately covered by a further curved glass pane.

In a preferred embodiment, the glass pane has a curvature in which the ratio between a curvature height across curve edges that bound the curvature and the size or length or width of the curved glass pane between the curve edges is in the range from 1:50 to 1:10.

In a further preferred embodiment, a critical curvature of the glass pane is assigned a critical stress in the cross section of the glass pane, in particular at the edge of the glass pane, of greater than 80 MPa when the glass pane is deformed from its curved configuration to a planar configuration. Greater changes in stress that exceed 80 MPa are thus critical changes in stress assigned to a critical curvature, which designate the curved glass pane to be printed for the printing of the invention.

Glass panes of the invention may have curves having a curve height, which states a difference in height between a curve edge and the middle of the curve, in the range from preferably about 15 mm to 120 mm, where the lengths of the glass panes assigned to these values are preferably within a range from about 0.5 m to 1.8 m. Curve radii of glass panes of the invention are preferably within a range from about 0.5 m to 7 m. The edge of the curve and middle of the curve relate, for example, to a glass pane in its entirety, such that the curve edges are the edges of the glass pane, or solely to curved regions of an otherwise slightly curved or planar glass pane. The glass pane may also be formed with a curve only in at least one edge region, and otherwise be planar or flat.

Appropriately, the printing ink has very low opacity. Accordingly, the printing ink preferably has a largely transparent or virtually completely transparent appearance in the print. The scattering particles, produced from iron oxide for example, reflect incident light. The scattering particles, because of their small size, do not stand out visually in the unlit state of the print. The unlit print then appears largely transparent in accordance with the opacity. On the other hand, the scattering particles may be formed in such a way that, because of their structure or their material, they themselves stand out visually in the print even without illumination. It is thus possible to produce, for example, graphic elements or translucent images.

The print preferably has at least one area subregion in which the printing ink has been applied in individual spaced-apart ink droplets. There are areas free of printing ink between the small or fine ink droplets or the ink dots or small printed areas of ink formed by the ink droplets, which interrupt the print. The print is thus largely transparent with illumination or incident light switched off. Such a print region with individual spaced-apart ink droplets in the manner of single pixels can be regarded as a cloud of pixels.

The print may have been applied with printing ink applied over the full area and containing scattering particles as an overall print area on the glass pane. The overall print area may have been formed with a continuous printing ink layer or with a printing ink layer printed from the above-elucidated spaced-apart ink droplets.

In addition, the print may cover only a subregion of the glass pane as a printed area subregion. Such a printed area subregion may take the form of a specially shaped pattern or scatter pattern. Two or more printed area subregions may be combined, even with at least one printed area subregion in which the printing ink has been applied by means of individual spaced-apart ink droplets.

In a preferred embodiment, at least subregions of the print have been reworked, structured or textured by laser treatment. It is possible here for scattering particle regions present in the print to have been textured by laser irradiation. In particular, in the printing operation, low-quality regions or edges of the print may be treated, such that contours of the print regions are sharpened or patterns are drawn in. For example, laser radiation can burn away printing ink in the print regions or at the edges of the print regions. In addition, it is also possible to remove print regions by laser ablation, for example. Reworking can also be effected by laser irradiation in combination with an etching operation. In principle, reworking can also be undertaken merely by etching.

Appropriately, the glass pane has been primed for the applied print. The priming is formed, for example, by laser roughening of the glass pane or by cleaning of the surface of the glass pane by laser or plasma. The priming is thus a basis for the printing or for a printed foil to be applied. The priming may also be effected by means of an adhesive applied to the glass pane, especially a spray adhesive, or in principle by means of a surface alteration of the glass pane, especially a laser roughening or plasma treatment of the glass pane.

A method of the invention for production of a glass pane of a vehicle glazing and having a print containing light-scattering particles, where light coupled laterally into the glass pane is outcoupled via the print by means of the scattering particles, is characterized in that a glass pane having a curvature or having a critical curvature that rules out reversible deformation of the glass pane to a planar configuration is provided, in that the print formed by a printing ink containing the light-scattering particles is applied over part of the area or the whole of the area on the outer curvature or the inner curvature of the glass pane, and in that the printing ink is applied in a digital printing method.

The print is accordingly applied, preferably directly, to the glass pane in its curved form by the digital printing method. There is no need for temporary deformation of the glass pane into a shape in which at least the region to be printed or to be coated is planar and hence suitable for screenprinting. The glass pane may be merely slightly curved in the region to be printed or to be coated, which may cover the whole glass area of the glass pane or one or more subregions, or else have a critical curvature. A critical curvature is a curvature that rules out deformation of the glass pane to a planar configuration. A critical curvature of the glass pane is assigned a critical stress in the cross section of the glass pane of, for example, greater than 80 MPa when the glass pane is deformed from its curved configuration to a planar configuration. Greater changes in stress that exceed 80 MPa, for example, are thus critical changes in stress assigned to a critical curvature, which designate the curved glass pane to be printed for the printing of the invention.

In digital printing, it is possible to use print media such as printing inks, printing colors and also printing varnishes for production of the print.

In addition, it is also possible to use functional printing inks. Electrically functional electronic or optical printing inks can be used to produce active and passive components. Use of light, current, voltage or heat results in reactions or changes in state, the effects of which, for example in the form of light, heat or radiation and the like, extend into the interior of the vehicle. It is thus possible, for example, to produce or print heating elements and other electrical and electronic components.

In the digital printing method, it is preferably possible to move a printhead relative to the curved glass pane at a defined and adjustable angle (generally 90 degrees to the surface) and/or at a defined printing distance from the surface of the curved glass pane to be printed. The printing distance may be kept constant over the entire area of the glass pane to be printed. On the other hand, when the glass pane has regions having different curvatures, the printhead may be moved with a greater printing distance in a region of the glass pane with high curvature by comparison with a region of the glass pane with lower curvature, in which the printhead is moved with a lower printing distance. This can have a positive effect on the quality of the print, which can be kept at a uniform quality level.

In the method, it is appropriately possible to rework at least a region of the print, especially by laser irradiation. It is thus possible to produce sharply contoured printed images.

In an appropriate procedure, it is possible to rework or resharpen an ink edge of a printed region or else a structure or a pattern in the applied printing ink within a region by irradiation or laser irradiation.

Such a printed region may, for example, have a low-quality print, for example a rough print with high ink layer thickness, having ink runs or overspray at the edges or borders. The reworking may comprise, for example, redrawing of patterns or the sharpening of contours, where a laser beam thermally burns away unwanted nonsharp edge lines of the ink layer. Sharp focusing of the laser beam establishes a sharply delimited ink edge.

The reworking elucidated for the glass pane can also be employed in the method.

In a preferred procedure, at least in a print subarea, the printing ink is applied by means of individual spaced-apart ink droplets. In this way, regions free of printing ink remain between the printed ink droplets. The print is thus interrupted by the regions free of printing ink between the small or fine printing ink droplets or between the ink dots or small printed areas of ink formed by the printing ink droplets. The print appears largely transparent with the incident light switched off.

Appropriately, the glass pane, in the regions to be printed, is provided with priming for the printing ink to be applied for the print. The priming can be effected, for example, by means of an adhesive applied to the glass pane, especially a spray adhesive, or by means of surface alteration of the glass pane, especially laser roughening or a plasma treatment of the glass pane, or by cleaning of the surface of the glass pane by laser or plasma.

BRIEF DESCRIPTIONS OF THE DRAWINGS

Figure 2:
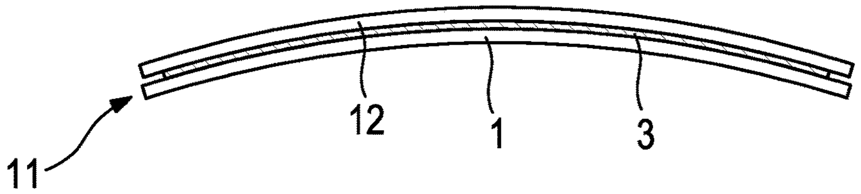
Figure 3:
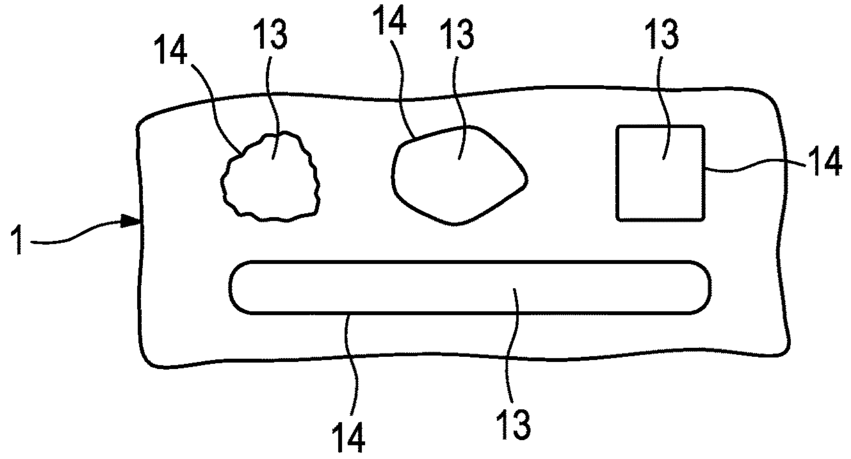
Figure 4:
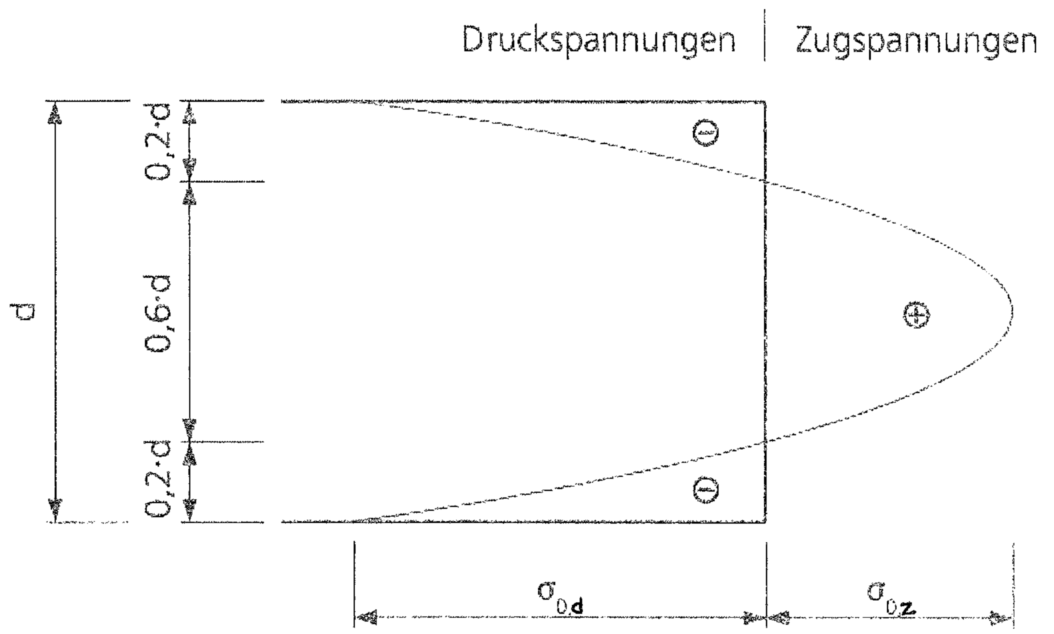
Figure 5:
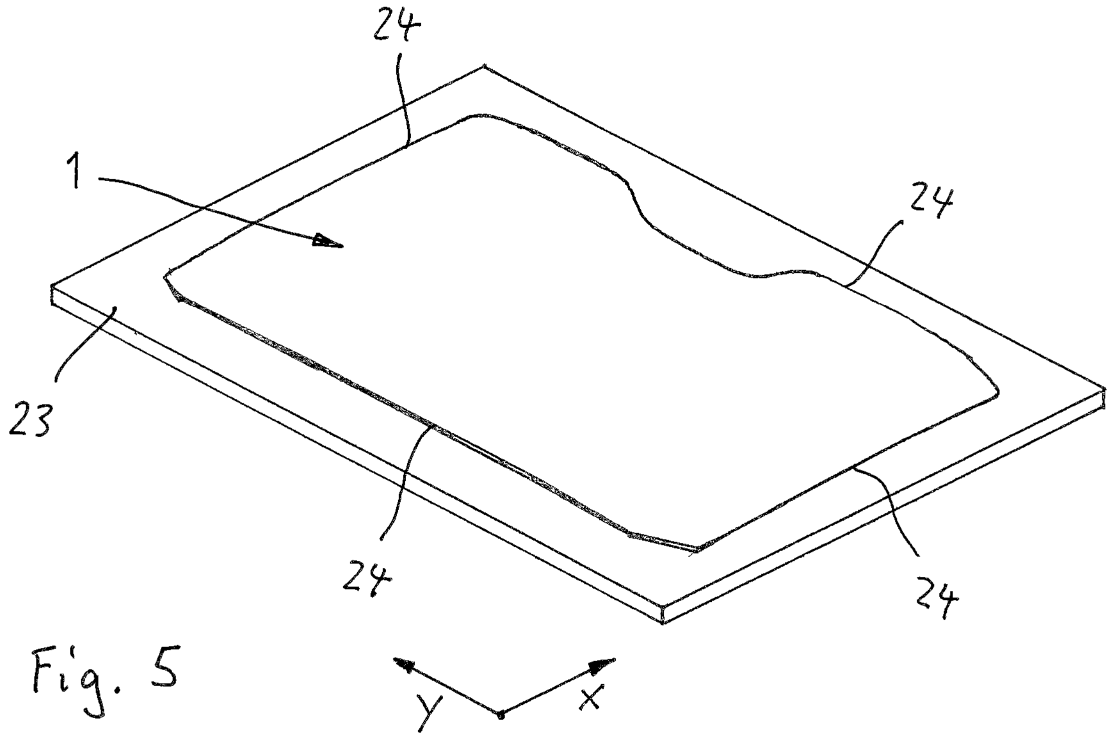

The invention is elucidated in detail by an embodiment of a curved glass pane printed by a digital printing device, with reference to the drawing. The figures show:

FIG. 1 a cross-sectional view in a schematic diagram of a curved glass pane with a print and with a digital printing device for production of the print on the glass pane;

FIG. 2 a cross-sectional view in a schematic diagram of a vehicle glazing in the form of a composite pane formed with a printed glass pane;

FIG. 3 an enlarged top view of a portion of the glass pane with print applied;

FIG. 4 a cross-sectional view of a heat-strengthened glass pane, showing tensile stresses and compressive stresses;

FIG. 5 an isometric view of a deformed glass pane on a support.

DETAILED DESCRIPTION

A curved glass pane 1 (FIG. 1) has a print 3 on its outer curvature 2. The print 3 has been produced by means of printing ink and applied by a digital printing device 4 to the outer curvature 2 of the glass pane 1. The glass pane 1 has a curve height 5 between the inner curvature 6 of the glass pane 1 in the middle of its curve 7 and a straight line 8 interconnecting two opposite outer edges 9 of the glass pane 1. The outer edges 9 of the glass pane 1 are also the curve edges 10 of the curvature of the glass pane 1 when the glass pane 1 in its entirety has the curvature. If only a portion of the glass pane 1 has such a curvature, the curve edges 10 may differ from the outer edges 9. The curvature shown in the glass pane 1 is illustrative and serves for elucidation. The glass pane 1 may also be curved in two or more directions or about two or more axes (see x axis and y axis in FIG. 5).

The curve height 5 is, for example, between about 1.5 cm and 12 cm. The length of the straight line 8 between the curve edges 10 of the curvature of the glass pane 1 or between the opposite outer edges 9 of the curved glass pane 1 is, for example, roughly between 50 cm and 180 cm.

The ratio between the curve height 5 and the curve edges 10 of the curvature is preferably within a range from, for example, 1:10 to 1:50.

A critical curvature of the glass pane 1 has a ratio between the curve height 5 and the curve edges 10 of the curvature of at least 1:50 and especially 1:10. A critical curvature is such a significant curvature that rules out reversible deformation of the glass pane 1 to a planar configuration owing to expected breakage of the glass.

A vehicle glazing 11 (see FIG. 2) contains such a curved and printed glass pane 1 and is especially formed with a second glass pane 12 as a composite glass pane. The vehicle glazing 11 is, for example, part of a vehicle roof.

The curved glass pane 1 may have been printed with the print 3 over the whole area. On the other hand, the print 3 may also have been produced from multiple printed area subregions 13 (FIG. 3). Such area subregions 13 may be spaced apart from one another or else be in contact with one another or merge into one another. The area subregions 13 may have any desired shapes and may have an irregular distribution or a pattern arrangement. In particular, such an area subregion 13 is a pictogram, a logo or else an alphanumeric symbol.

An edge 14 or a border of such a printed area subregion 13 can be refined and contoured by an aftertreatment, especially by laser irradiation. This aftertreatment is appropriate especially when the printing ink has run at the edge 14. By means of a laser beam, printing ink at nonsharp edge or border lines of the ink layer is burnt away thermally, such that the edge 14 is sharpened.

For printing of the glass pane 1, the digital printing device 4 is disposed on the side facing the outer curvature 2 of the glass pane 1 (FIG. 1). The digital printing device 4 has a printhead 15 for printing of the curved glass pane 1. The printhead 15 is mounted so as to be movable relative to the glass pane 1 by means of a bearing device 16. A control device is provided, which actuates the bearing device 16 in such a way that it keeps the printhead 15 at a defined printing distance and/or angle from the surface of the glass pane 1 to be printed. The control device, by means of data representing the surface geometry of the glass pane 1, controls a motor drive of the bearing device 16. The control device preferably contains at least one sensor 17 which detects the printing distance and/or the angle of the printhead 15 from the surface of the glass pane 1 to be printed and permits closed-loop control or path correction.

The bearing device 16 has a printhead carrier 18 which is moved in an x-y plane across the surface of the glass pane 1 and is movable in z direction relative to the surface of the glass pane 1. The printhead 15 may be mounted pivotably on the printhead carrier 18 about a pivot axis 19 aligned at right angles to the z axis. On the other hand, the printhead 15 may also be disposed in a fixed manner on the printhead carrier 15, and the printhead carrier 18 may be mounted pivotably about a pivot axis 20 aligned at right angles to the z axis. Finally, it may also be the case that the printhead 15 is mounted pivotably on the printhead carrier 18 about the pivot axis 19 which is aligned at right angles to the z axis, and the printhead carrier 18 is mounted pivotably about the pivot axis 20 which is aligned at right angles to the z axis.

Preferably, in the course of printing of the surface of the glass pane 1, multiple sensors 17 detect the surface of the glass pane 1 and especially the curvature of the glass pane 1, where the control device, by means of the sensor data, aligns the printhead 15 in its respective position vertically with respect to the surface of the glass pane 1 and keeps it at the defined printing distance.

Appropriately, a drying unit 21 is provided, which is mounted on the bearing device 16 and assigned to the printhead 15, and tracks the printhead 15. The drying unit 21 is preferably mounted on the printhead carrier 18 in a fixed or movable manner, for example by means of a pivot joint or pivotable about a pivot axis 22. On the other hand, the drying unit 21 may also have an independent movable and adjustable mount.

The drying is preferably effected by UV light. A UV source is disposed on the printhead 15, which tracks the printhead 15. The intensity of the UV irradiation is preferably such that the printing ink adheres in a first step and is cured in a further step, for example including in a separate curing chamber. It may be the case here that, after the adhesion, testing of the printed image and of the print takes place and, in the case of an improper print or printed image, the print is at least partially removed.

In another method, it is possible with the aid of a UV source to cure the printing ink immediately after the local application.

The digital printing device 4 may be formed either as a gantry robot or as a robot with a robot arm movable about several axes.

An inventive glass pane 1 is, for example, a heat-strengthened glass having a thickness d of 1.4 mm to 2.5 mm, preferably of 1.8 mm to 2.2 mm and especially of 2.1 mm. In the curved glass pane 1, by known thermal treatment in the production thereof, compressive stresses god have been generated in the glass material thereof on the outer face over the cross section thereof, and tensile stresses $\sigma_{0,z}$ in the interior (see FIG. 4). The compressive stress generated is, for example, up to a maximum of about 40 MPa. The curved glass pane 1 is placed on a planar support 23 (FIG. 5) and a load is applied centrally until all edges 24 of the glass pane 1 are in contact with the support 23 with initial deformation. The further application of stress is effected, for example, by means of multiple suction cups (not shown), which are distributed in the support 23 and deform the glass pane 1 into a completely planar configuration on the support 23. The compressive stresses are transformed to tensile stresses by the bending of the glass pane 1. In the deformation, especially at the edge 24 of the glass pane 1, cracks occur, which can lead to breakage of the glass. Such cracks occur especially in the case of tensile stresses of greater than 40 MPa. The tensile stresses at the edge should therefore not be greater than, for example, 40 MPa, in order to avoid breakage of the glass. In the case of deformation of the glass pane from its curved configuration to the planar configuration, stresses in the glass material of −40 MPa (compressive stress $\sigma_{0,d}$) to +40 MPa (tensile stress $\sigma_{0,z}$), i.e. a total stress or a change in stress of less than 80 MPa, may thus be permissible before the glass pane could break. Larger changes in stress exceeding 80 MPa are thus critical changes in stress assigned to a critical curvature, which designate the glass pane 1 to be printed for the printing of the invention.

| List of reference numerals | |
|---|---|
| 1 | glass pane |
| 2 | outer curvature |
| 3 | print |
| 4 | digital printing device |
| 5 | curvature height |
| 6 | inner curvature |
| 7 | middle of curve |
| 8 | straight line |
| 9 | outer edge |
| 10 | edge of curve |
| 11 | vehicle glazing |
| 12 | second glass pane |
| 13 | area subregion |

-continued

| List of reference numerals | |
|---|---|
| 14 | edge |
| 15 | printhead |
| 16 | bearing device |
| 17 | sensor |
| 18 | printhead carrier |
| 19 | pivot axis |
| 20 | pivot axis |
| 21 | drying unit |
| 22 | pivot axis |
| 23 | support |
| 24 | edge |

The invention claimed is:

1. A glass pane of a vehicle glazing, where the glass pane has a print containing light-scattering particles, and where light coupled laterally into the glass pane is outcoupled via the print by the light-scattering particles, wherein the glass pane has a critical curvature that rules out reversible deformation of the glass pane to a planar configuration and in that the print formed by a printing ink in a digital printing method is disposed over part of the area or the whole of the area on the outer curvature or the inner curvature of the glass pane.

2. The glass pane as claimed in claim 1, wherein the glass pane has a curvature in which the ratio between a curvature height across curve edges that bound the curvature and the size or length or width of the curved glass pane between the curve edges is in the range from 1:50 to 1:10 and/or in that a critical curvature of the glass pane is assigned a critical stress in the cross section of the glass pane of greater than 80 MPa when the glass pane is deformed from its curved configuration to a planar configuration.

3. The glass pane as claimed in claim 1, wherein the glass pane has a curvature with a curvature height across curve edges that bound the curvature in the range from 15 mm to 120 mm.

4. The glass pane as claimed in claim 1, wherein the printing ink is transparent.

5. The glass pane as claimed in claim 1, wherein the print has at least one area subregion in which the printing ink has been applied in individual spaced-apart ink droplets.

6. The glass pane as claimed claim 1, wherein the print has been formed with at least one planarily printed area subregion or as a printed full area with printing ink applied over the whole area.

7. The glass pane as claimed in claim 5, wherein a printed area subregion has a texture established in an aftertreatment of the print by laser irradiation of an edge of the printed area subregion.

8. The glass pane as claimed in claim 1, wherein the glass pane has been primed for the print applied.

9. A method of producing a glass pane of a vehicle glazing and having a print containing light-scattering particles, comprising:

outcoupling light coupled laterally into the glass pane via the print by the scattering particles, providing a glass pane having a critical curvature that rules out reversible deformation of the glass pane to a planar configuration, applying the print formed by a printing ink containing the light-scattering particles over part of the area or the whole of the area on the outer curvature or the inner curvature of the glass pane, and applying the printing ink in a digital printing method disposed over part of the area or the whole of the area on the outer curvature or the inner curvature of the glass pane.

10. The method as claimed in claim 9, wherein, in the digital printing method, a printhead is moved relative to the curved glass pane at a defined printing distance from the surface of the curved glass pane to be printed.

11. The method as claimed in claim 9, wherein the glass pane has regions with different curvatures and in that the printhead is moved at a greater printing distance in a region of the glass pane with high curvature by comparison with a region of the glass pane with lower curvature, in which the printhead is moved at a smaller printing distance.

12. The method as claimed in claim 9, wherein an edge of a printed region is reworked or resharpened by irradiating or lasering.

13. The method as claimed in any of claim 9, wherein, at least in a subarea of the print or a printed subarea region, applying the printing ink is by applying individual spaced-apart ink droplets.

14. The method as claimed in claim 9, further comprising priming the glass pane, in the regions to be printed, for the printing ink to be applied.

15. The method as claimed in claim 14, wherein the priming is made by applying of an adhesive to the glass pane, by a spray adhesive, or of a surface alteration or surface cleaning of the glass pane.

16. The method as claimed in claim 15, wherein the surface cleaning of the glass pane is by a laser roughening or plasma treatment of the glass pane.

* * * * *